US010551675B2

(12) United States Patent
Jia

(10) Patent No.: US 10,551,675 B2
(45) Date of Patent: Feb. 4, 2020

(54) DISPLAY SUBSTRATE, LIQUID CRYSTAL DISPLAY PANEL AND DISPLAY DEVICE

(71) Applicant: BOE TECHNOLOGY GROUP CO., LTD., Beijing (CN)

(72) Inventor: Qian Jia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/512,472

(22) PCT Filed: May 13, 2016

(86) PCT No.: PCT/CN2016/082061
§ 371 (c)(1),
(2) Date: Mar. 17, 2017

(87) PCT Pub. No.: WO2017/166388
PCT Pub. Date: Oct. 5, 2017

(65) Prior Publication Data
US 2019/0011750 A1 Jan. 10, 2019

(30) Foreign Application Priority Data
Mar. 30, 2016 (CN) .......................... 2016 1 0191414

(51) Int. Cl.
G02F 1/13363 (2006.01)
G02F 1/1335 (2006.01)
(52) U.S. Cl.
CPC .... *G02F 1/13363* (2013.01); *G02F 1/133528* (2013.01); *G02F 1/133634* (2013.01); *G02F 2202/40* (2013.01); *G02F 2413/03* (2013.01); *G02F 2413/08* (2013.01)
(58) Field of Classification Search
CPC ........... G02F 1/13363; G02F 1/133528; G02F 2202/40; G02F 2413/03; G02F 2413/08; G02F 1/133634
See application file for complete search history.

(56) References Cited

U.S. PATENT DOCUMENTS

2004/0066482 A1  4/2004  Tanaka
2005/0185124 A1* 8/2005  Kadoya ................ G02B 5/3083
                                                        349/117
(Continued)

FOREIGN PATENT DOCUMENTS

CN    1481516 A    3/2004
CN    1651997 A    8/2005
(Continued)

OTHER PUBLICATIONS

International Search Report and Written Opinion for Application No. PCT/CN2016/082061, dated Dec. 26, 2016, 11 Pages.
(Continued)

*Primary Examiner* — Nathanael R Briggs
(74) *Attorney, Agent, or Firm* — Brooks Kushman P.C.

(57) ABSTRACT

The present disclosure provides a display substrate, a liquid crystal display panel and a display device. The display substrate includes a base substrate, and an optical compensation structure attached to the base substrate. The optical compensation structure is capable of expanding viewing angle ranges of the display substrate in different directions.

17 Claims, 2 Drawing Sheets

(56) References Cited

U.S. PATENT DOCUMENTS

| | | | |
|---|---|---|---|
| 2005/0219449 A1* | 10/2005 | Tanaka | G02B 5/3083 349/119 |
| 2006/0285051 A1 | 12/2006 | Jeon et al. | |
| 2007/0058120 A1 | 3/2007 | Nagai | |
| 2009/0103029 A1 | 4/2009 | Miyazaki et al. | |
| 2010/0053510 A1 | 3/2010 | Bitou et al. | |
| 2010/0271580 A1* | 10/2010 | Murakami | G02F 1/133634 349/118 |
| 2013/0088666 A1 | 4/2013 | Ikeda et al. | |
| 2014/0340619 A1 | 11/2014 | Yeh | |
| 2015/0146142 A1 | 5/2015 | Kang et al. | |
| 2015/0309369 A1 | 10/2015 | Kang et al. | |

FOREIGN PATENT DOCUMENTS

| | | | |
|---|---|---|---|
| CN | 1904698 A | 1/2007 | |
| CN | 1932561 A | 3/2007 | |
| CN | 101061425 A | 10/2007 | |
| CN | 101542368 A | 9/2009 | |
| CN | 101548205 A | 9/2009 | |
| CN | 101903813 A | 12/2010 | |
| CN | 103091902 A | 5/2013 | |
| CN | 103293758 A | 9/2013 | |
| CN | 103605239 A | 2/2014 | |

OTHER PUBLICATIONS

First Office Action for Chinese Application No. 201610191414.6, dated May 25, 2018, 5 Pages.

\* cited by examiner

DISPLAY SUBSTRATE, LIQUID CRYSTAL DISPLAY PANEL AND DISPLAY DEVICE

CROSS-REFERENCE TO RELATED APPLICATIONS

This application is the U.S. national phase of PCT Application No. PCT/CN2016/082061 filed on May 13, 2016, which claims priority to Chinese Patent Application No. 201610191414.6 filed on Mar. 30, 2016, the disclosures of which are incorporated in their entirety by reference herein.

TECHNICAL FIELD

The present disclosure relates to the field of display technology, and more particularly to a display substrate, a liquid crystal display panel and a display device.

BACKGROUND

In a related art, because of the optical properties of a base substrate, a flexible liquid crystal display panel has some problems as follows: in a dark state, an optical retardation of a base substrate in a thickness direction is large, which will result in a change of a polarization state of light, a light leakage of the liquid crystal display panel in a dark state and a worse viewing angle, thus affecting a display effect of the liquid crystal display panel.

SUMMARY

An object of the present disclosure is to provide a display substrate, a liquid crystal display panel and a display device to improve the display effect of the liquid crystal display panel.

In one aspect, the present disclosure provides in some embodiments a display substrate including: a base substrate; and an optical compensation structure attached to the base substrate, wherein the optical compensation structure is capable of expanding viewing angle ranges of the display substrate in different directions.

Furthermore, one side of the base substrate is provided with a polarizer, a polarization direction of light after passing through the polarizer and the optical compensation structure successively is identical to that after passing through the polarizer.

Furthermore, the optical compensation structure includes: a first optical compensation film arranged on one side of the base substrate, wherein the first optical compensation film satisfies the following optical condition: $n_x > n_z > n_y$, where $n_x$ is a refractivity of a surface of the optical compensation film in an x-axis direction, $n_y$ is a refractivity of the surface of the optical compensation film in a y-axis direction, $n_z$ is a refractivity of the surface of the optical compensation film in a z-axis direction; a second optical compensation film arranged on the other side of the base substrate, wherein the second optical compensation film satisfies the following optical condition: $n_z > n_x = n_y$; and a third optical compensation film arranged on a side of the second optical compensation film away from the base substrate, wherein the third optical compensation film satisfies the following optical condition: $n_x > n_z > n_y$.

Furthermore, in-plane retardation of the first optical compensation film is in the range of 180~220 nm, and a refractivity of the first optical compensation film in a thickness direction is 0.75. In-plane retardation of the second optical compensation film is in the range of 2420~2550 nm, and a refractivity of the second optical compensation film in a thickness direction tends to negative infinity. In-plane retardation of the third optical compensation film is in the range of 250~300 nm, and a refractivity of the third optical compensation film in a thickness direction is 0.25. Here, the in-plane retardation=$(n_x - n_y) * d$, the refractivity in a thickness direction=$(n_x - n_z)/(n_x - n_y)$, and d is a thickness of each optical compensation film.

Furthermore, the in-plane retardation of the first optical compensation film is 206 nm.

Furthermore, the in-plane retardation of the second optical compensation film is 2480 nm.

Furthermore, the in-plane retardation of the third optical compensation film is 276 nm.

Furthermore, the base substrate is a polyimide substrate.

Furthermore, the first optical compensation film is arranged between the polarizer and the base substrate, the second optical compensation film is arranged on the side of the base substrate away from the polarizer, and the third optical compensation film is arranged on the side of the second optical compensation film away from the base substrate.

The present disclosure further provides in some embodiments a liquid crystal display panel, including the above described display substrate.

The present disclosure further provides in some embodiments a display device, including the above described liquid crystal display panel.

Embodiments of the present disclosure have following beneficial effects. In above solutions, an optical compensation structure is attached to the base substrate, and the optical compensation structure is capable of expanding viewing angle ranges of the display substrate in different directions, thus reducing a phase difference of the display substrate in a thickness direction. In this way, when the liquid crystal display panel adopting the display substrate according to the present disclosure, a viewing angle of the liquid crystal display panel in a dark state may be improved, and an occurrence of light leakage is avoided, thus improving the display effect of the liquid crystal display panel.

Figure 1:
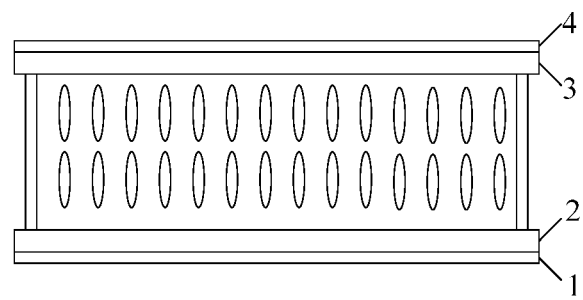
FIG. 1 is a schematic diagram showing a liquid crystal display panel in a related art.

DRAWING REFERENCE 1 first polarizer
2, 3 base substrates
4 second polarizer
5 first optical compensation film
6 second optical compensation film
7 third optical compensation film

DETAILED DESCRIPTION

In order to make the objects, the technical solutions and the advantages of some embodiments of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

In order to solve the problem that the optical retardation of the base substrate in a thickness direction is large, which will result in a worse viewing angle of the liquid crystal display panel in a dark state and a large light leakage, thus affecting the display effect of the liquid crystal display panel in a related art, the present disclosure provides in some embodiments a display substrate, a liquid crystal display panel and a display device, which may improve the display effect of the liquid crystal display panel.

The present disclosure provides in some embodiments a display substrate, including: a base substrate; and an optical compensation structure attached to the base substrate. The optical compensation structure is capable of expanding viewing angle ranges of the display substrate in different directions.

According to embodiments of the present disclosure, an optical compensation structure is attached to the base substrate, and the optical compensation structure is capable of expanding viewing angle ranges of the display substrate in different directions, and thereby reducing a phase difference of the display substrate in a thickness direction. In this way, when the liquid crystal display panel adopting the display substrate according to the present disclosure, the viewing angle of the liquid crystal display panel in a dark state may be improved, and the occurrence of light leakage is avoided, thus improving the display effect of the liquid crystal display panel.

Furthermore, one side of the base substrate is provided with a polarizer, such that a polarization direction of light after passing through the polarizer, the optical compensation structure and the base substrate successively is identical to that after passing through the polarizer, even when viewing obliquely or at a certain angle. In this way, the viewing angle of the liquid crystal display panel in a dark state may be improved, thus improving the display effect of the liquid crystal display panel.

FIG. 1 is a schematic diagram showing a liquid crystal display panel in the related art. The flexible liquid crystal display panel in the related art includes a first substrate and a second substrate which are arranged to form a cell. The second substrate is arranged on the first substrate. The second substrate includes a base substrate 3, and one side of the base substrate 3 is provided with a second polarizer 4. The first substrate includes a base substrate 2, and one side of the base substrate 2 is provided with a first polarizer 1. Specifically, the base substrate 2 may be a polyimide (PI) substrate. Obviously, the base substrate 2 may also be other base substrates, such as a resin substrate. In the case that the base substrate 2 is a PI substrate, in a dark state, in-plane retardation (Ro) of the PI substrate=0, while thickness-direction retardation (Rth) may be quite large, for example, may reach up to 2330 nm. However, the large Rth will result in a worse viewing angle of the liquid crystal display panel in a dark state and a large light leakage, thus affecting the display effect of the liquid crystal display panel. Factors affecting the viewing angle in the dark state may include different optical retardations of the base substrate at different viewing angles, which will result in the polarization direction of light after passing through the first polarizer and the base substrate successively being not perpendicular to that after passing through the second polarizer, when the display panel is viewed obliquely.

Taking the PI substrate as an example, since the Ro of the PI substrate=0, and the Rth of the PI substrate=2330 nm, the PI substrate is equivalent to a C-plate (which may refer to a uniaxial birefringence plate having an extraordinary axis or an optical axis that is perpendicular to a plane of the plate or parallel to an incident light direction, that is, an optical film which satisfies a condition of $n_x=n_y>n_z$), and an equation of each retardation of the C-plate at different viewing angles is:

$$\Gamma_c = \frac{2\pi}{\lambda} n_o d \left( \sqrt{1 - \frac{\sin^2\theta_0}{n_e^2}} - \sqrt{1 - \frac{\sin^2\theta_0}{n_o^2}} \right).$$

wherein $\Gamma_c$ is each retardation at different viewing angles, $\lambda$ is a wavelength of light, $n_o$ is a refractivity in a direction parallel to a long axis of liquid crystal molecules, and d is a thickness of the optical compensation film, $n_e$ is a refractivity in a direction perpendicular to the long axis of liquid crystal molecules, and $\theta_0$ is an angle between a sight line and a normal line. Since the Rth is large, the retardation of the C-plate shows a cyclic change, and the maximum retardation may reach up to 270 nm.

In addition, each angle $\psi$ of the polarization direction of the light after passing through the first polarizer and the second polarizer at different viewing angles satisfies the following condition:

$$\cos\psi = \frac{-\sin^2\theta_k \cos(\phi_2 - \phi_k)\cos(\phi_k - \phi_1)}{\sqrt{1 - \sin^2\theta_k \cos^2(\phi_k - \phi_1)} \sqrt{1 - \sin^2\theta_k \cos^2(\phi_2 - \phi_k)}}$$

wherein $\theta_k$ is a polar angle direction when viewing, $\varphi_1$ is an included angle of the first polarizer, $\varphi_2$ is an included angle of the second polarizer, and $\varphi_k$ is an azimuthal angle when viewing.

Therefore, when carrying out a compensation, the light leakage in a dark state caused by the above two factors is mainly compensated.

Figure 3:
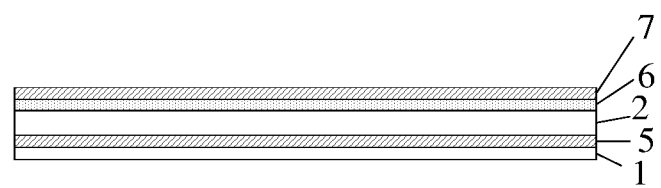
FIG. 3 is a schematic diagram showing a display substrate according to embodiments of the present disclosure.

In view of the above, an embodiment of the present disclosure provides a display substrate. As shown in FIG. 3, the display substrate in the embodiment of the present disclosure includes a base substrate 2, and one side of the base substrate 2 is provided with a first polarizer 1. Furthermore, the display substrate in the embodiment of the present disclosure further includes an optical compensation structure attached to the base substrate 2, and the optical compensation structure is capable of expanding viewing angle ranges of the display substrate in different directions. Specifically, the optical compensation structure includes: a first optical compensation film 5 arranged between the base substrate 2 and the first polarizer 1, a second optical compensation film 6 arranged on a side of the base substrate 2 away from the first polarizer 1, a third optical compensation film 7 arranged on a side of the second optical compensation film 6 away from the base substrate 2.

In an optional embodiment, the base substrate is a PI substrate. In this way, the display substrate may be applied in a flexible display. Obviously, the base substrate 2 may also be other types of base substrates, such as a quartz substrate, a resin substrate or a glass substrate.

After attaching the optical compensation structure to the base substrate 2, the polarization direction of light after passing through the first polarizer 1, the optical compensation structure and the base substrate successively is identical to that after passing through the first polarizer 1.

The first optical compensation film 5 satisfies the following optical condition: $n_x > n_z > n_y$, where $n_x$ is a refractivity of a surface of the optical compensation film in an x-axis direction, $n_y$ is a refractivity of the surface of the optical compensation film in a y-axis direction, $n_z$ is a refractivity of the surface of the optical compensation film in a z-axis direction. Here, the x-axis, the y-axis and the z-axis are orthogonal to each other. The second optical compensation film 6 satisfies the following optical condition: $n_z > n_x = n_y$. The third optical compensation film 7 satisfies the following optical condition: $n_x > n_z > n_y$.

Through a large number of experiments, it has been proved that, in the case that the first optical compensation film 5, the second optical compensation film 6 and the third optical compensation film 7 each takes the following values respectively, the viewing angle of the display substrate in a dark state may be effectively improved, and the occurrence of light leakage is avoided, thus improving the display effect of the display substrate.

In-plane retardation of the first optical compensation film 5 is in the range of 180~220 nm, and a refractivity of the first optical compensation film 5 in a thickness direction is 0.75. In-plane retardation of the second optical compensation film 6 is in the range of 2420~2550 nm, and a refractivity of the second optical compensation film 6 in a thickness direction tends to negative infinity. In-plane retardation of the third optical compensation film 7 is in the range of 250~300 nm, and a refractivity of the third optical compensation film 7 in a thickness direction is 0.25. Here, in-plane retardation=$(n_x - n_y)*d$, the refractivity in a thickness direction $N_z = (n_x - n_z)/(n_x - n_y)$, and d is a thickness of each optical compensation film.

Optionally, the in-plane retardation of the first optical compensation film 5 is 206 nm, the in-plane retardation of the second optical compensation film 6 is 2480 nm, and the in-plane retardation of the third optical compensation film 7 is 276 nm.

Meanwhile, through experiments, it has been proved that, after attaching an optical compensation structure according to the embodiment of the present disclosure to the base substrate 2, the maximum light transmissivity of the display substrate in a dark state is 0.000355, which greatly improves light leakage phenomena.

Figure 4:
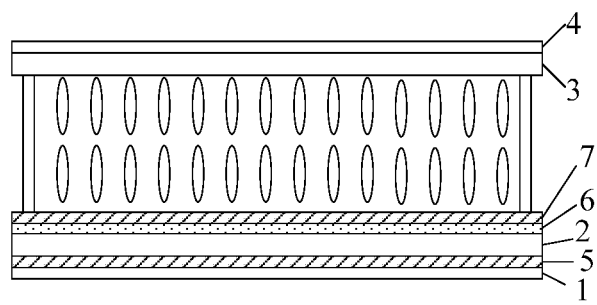
FIG. 4 is a schematic diagram showing a liquid crystal display panel according to embodiments of the present disclosure.

The embodiment of the present disclosure provides a liquid crystal display panel. As shown in FIG. 4, the liquid crystal display panel according to the embodiment of the present disclosure includes a first substrate and a second substrate which are arranged to form a cell. The second substrate is arranged on the first substrate and includes a base substrate 3, and a second polarizer 4 is attached to the base substrate 3. The first substrate includes a base substrate 2, and a first polarizer 1 is attached to the base substrate 2. Furthermore, the liquid crystal display panel according to the embodiment of the present disclosure further includes an optical compensation structure attached to the base substrate 2, and the optical compensation structure is capable of expending viewing angle ranges of the liquid crystal display panel in different directions. Specifically, the optical compensation structure includes a first optical compensation film 5 arranged between the base substrate 2 and the first polarizer 1, a second optical compensation film 6 arranged on a side of the base substrate 2 away from the first polarizer 1, and a third optical compensation film 7 arranged on a side of the second optical compensation film 6 away from the base substrate 2.

In an optional embodiment, the base substrate 2 is a PI substrate. In this way, the base substrate 2 may be applied in a flexible display. Obviously, the base substrate 2 may also be other types of base substrates, such as a quartz substrate, a resin substrate or a glass substrate.

After attaching the optical compensation structure to the base substrate 2, the polarization direction of light after passing through the first polarizer 1, the optical compensation structure and the base substrate successively is identical to that after passing through the first polarizer 1.

The first optical compensation film 5 satisfies the following optical condition: $n_x > n_z > n_y$, where $n_x$ is a refractivity of a surface of the optical compensation film in an x-axis direction, $n_y$ is a refractivity of the surface of the optical compensation film in a y-axis direction, $n_z$ is a refractivity of the surface of the optical compensation film in a z-axis direction. The second optical compensation film 6 satisfies the following optical condition: $n_z > n_x = n_y$. The third optical compensation film 7 satisfies the following optical condition: $n_x > n_z > n_y$. That is, the first optical compensation film 5 and the third optical compensation film 7 are each equivalent to a Z-film, and the second optical compensation film 6 is equivalent to a C-plate.

Through a large number of experiments, it has been proved that, in the case that the first optical compensation film 5, the second optical compensation film 6 and the third optical compensation film 7 each takes the following values respectively, the viewing angle of the display substrate in a dark state may be effectively improved, and the occurrence of light leakage is avoided, thus improving the display effect of the display substrate. In-plane retardation of the first optical compensation film 5 is in the range of 180~220 nm, and a refractivity of the first optical compensation film 5 in a thickness direction is 0.75. In-plane retardation of the second optical compensation film 6 is in the range of 2420~2550 nm, and a refractivity of the second optical compensation film 6 in a thickness direction tends to negative infinity. In-plane retardation of the third optical compensation film 7 is in the range of 250~300 nm, and a refractivity of the third optical compensation film 7 in a thickness direction is 0.25. Here, the in-plane retardation= $(n_x - n_y)*d$, the refractivity in a thickness direction $N_z = (n_x - n_z)/(n_x - n_y)$, and d is a thickness of each optical compensation film.

Optionally, the in-plane retardation of the first optical compensation film 5 is 206 nm, the in-plane retardation of the second optical compensation film 6 is 2480 nm, and the in-plane retardation of the third optical compensation film 7 is 276 nm.

Figure 2:
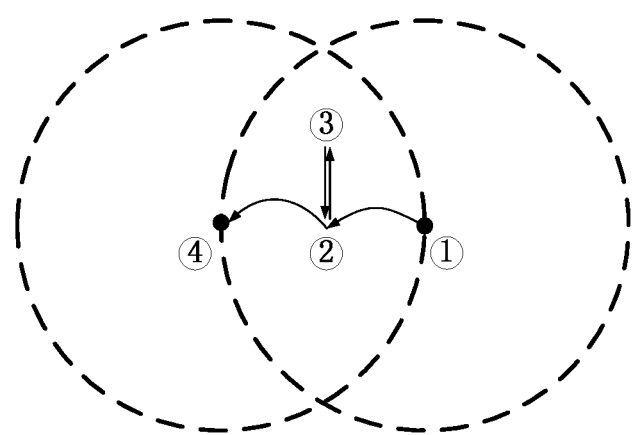
FIG. 2 is schematic diagram showing an operating principle according to embodiments of the present disclosure.

As shown in FIG. 2, point ① represents a position of a vibration direction of the light at a certain point on a simplified Poincare Sphere after passing through the first polarizer 1, and point ④ represents that after arriving at the second polarizer 4, at the time of viewing. When viewing vertically, the direction of light after passing through the first polarizer 1 is ①, which coincides with the direction ④ of light after arriving at the second polarizer 4, that is, the phase of light has not been changed. Therefore, there is no retardation. However, when viewing obliquely, since phase retardation to the light is generated in the base substrate, the vibration direction of the light will change. In the case that no optical compensation structure is arranged, direction ① and direction ④ do not coincide with each other anymore. According to embodiments of the present disclosure, by attaching the optical compensation structure provided by the embodiment of the present disclosure to the base substrate 2, when viewing obliquely, the light passes through the first polarizer 1, the first optical compensation film 5, the base substrate 2, the second optical compensation film 6 and the third optical compensation film 7 successively, and the positions of light on the Poincare Sphere are correspondingly changed from ① to ②, from ② to ③, from ③ to ② and from ② to ④, therefore, the phase retardation of light is compensated before arriving at the second polarizer 4. That is, the polarization direction of light after passing through the first polarizer, the optical compensation structure and the base substrate successively is identical to that after passing through the first polarizer, which improves the light leakage of the display substrate in a dark state, thus expending viewing angle ranges of the display substrate in different directions. After attaching the optical compensation structure according to the embodiment of the present disclosure to the liquid crystal display panel, the maximum transmittance of the liquid crystal display panel in a dark state is 0.000355, which greatly improves the occurrence of light leakage phenomena.

The embodiment of the present disclosure further provides a display device, including the above described liquid crystal display panel.

The above are merely the preferred embodiments of the present disclosure. It should be noted that, a person skilled in the art may make improvements and modifications without departing from the principle of the present disclosure, and these improvements and modifications shall also fall within the scope of the present disclosure.

What is claimed is:

1. A display substrate, comprising:
   a base substrate; and
   an optical compensation structure attached to the base substrate, wherein the optical compensation structure is capable of expanding viewing angle ranges of the display substrate in different directions,
   wherein the optical compensation structure comprises:
   a first optical compensation film arranged on one side of the base substrate, wherein the first optical compensation film satisfies the following optical condition: $n_x > n_z > n_y$, where $n_x$ is a refractivity of a surface of the optical compensation film in an x-axis direction, $n_y$ is a refractivity of the surface of the optical compensation film in a y-axis direction, $n_z$ is a refractivity of the surface of the optical compensation film in a z-axis direction;
   a second optical compensation film arranged on the other side of the base substrate, wherein the second optical compensation film satisfies the following optical condition: $n_z > n_x = n_y$; and
   a third optical compensation film arranged on a side of the second optical compensation film away from the base substrate, wherein the third optical compensation film satisfies the following optical condition: $n_x > n_z > n_y$.

2. The display substrate according to claim 1, wherein one side of the base substrate is provided with a polarizer, a polarization direction of light after passing through the polarizer, the optical compensation structure and the base substrate successively is identical to that after passing through the polarizer.

3. The display substrate according to claim 1, wherein
   in-plane retardation of the first optical compensation film is in the range of 180~220 nm, and a refractivity of the first optical compensation film in a thickness direction is 0.75;
   in-plane retardation of the second optical compensation film is in the range of 2420~2550 nm, and a refractivity of the second optical compensation film in a thickness direction tends to negative infinity;
   in-plane retardation of the third optical compensation film is in the range of 250~300 nm, and a refractivity of the third optical compensation film in a thickness direction is 0.25;
   wherein the in-plane retardation=$(n_x - n_y)*d$, the refractivity in a thickness direction=$(n_x - n_z)/(n_x - n_y)$, and d is a thickness of each optical compensation film.

4. The display substrate according to claim 3, wherein the in-plane retardation of the first optical compensation film is 206 nm.

5. The display substrate according to claim 3, wherein the in-plane retardation of the second optical compensation film is 2480 nm.

6. The display substrate according to claim 3, wherein the in-plane retardation of the third optical compensation film is 276 nm.

7. The display substrate according to claim 2, wherein the first optical compensation film is arranged between the polarizer and the base substrate, the second optical compensation film is arranged on the side of the base substrate away from the polarizer, and the third optical compensation film is arranged on the side of the second optical compensation film away from the base substrate.

8. The display substrate according to claim 1, wherein the base substrate is a polyimide substrate.

9. The display substrate according to claim 8, wherein one side of the base substrate is provided with a polarizer, a polarization direction of light after passing through the polarizer, the optical compensation structure and the base substrate successively is identical to that after passing through the polarizer.

10. The display substrate according to claim 7, wherein the first optical compensation film is arranged between the polarizer and the base substrate, the second optical compensation film is arranged on the side of the base substrate away from the polarizer, and the third optical compensation film is arranged on the side of the second optical compensation film away from the base substrate.

11. The display substrate according to claim 7, wherein
   in-plane retardation of the first optical compensation film is in the range of 180~220 nm, and a refractivity of the first optical compensation film in a thickness direction is 0.75;
   in-plane retardation of the second optical compensation film is in the range of 2420~2550 nm, and a refractivity of the second optical compensation film in a thickness direction tends to negative infinity;

in-plane retardation of the third optical compensation film is in the range of 250~300nm, and a refractivity of the third optical compensation film in a thickness direction is 0.25;

wherein the in-plane retardation=$(n_x-n_y)$ *d, the refractivity in a thickness direction=$(n_x-n_z)/(n_x-n_y)$, and d is a thickness of each optical compensation film.

12. The display substrate according to claim 11, wherein in-plane retardation of the first optical compensation film is in the range of 180~220 nm, and a refractivity of the first optical compensation film in a thickness direction is 0.75;

in-plane retardation of the second optical compensation film is in the range of 2420~2550 nm, and a refractivity of the second optical compensation film in a thickness direction tends to negative infinity;

in-plane retardation of the third optical compensation film is in the range of 250~300 nm, and a refractivity of the third optical compensation film in a thickness direction is 0.25;

wherein the in-plane retardation=$(n_x-n_y)$*d, the refractivity in a thickness direction$(n_x-n_z)/(n_x-n_y)$, and d is a thickness of each optical compensation film.

13. The display substrate according to claim 12, wherein the in-plane retardation of the first optical compensation film is 206 nm.

14. The display substrate according to claim 12, wherein the in-plane retardation of the second optical compensation film is 2480 nm.

15. The display substrate according to claim 12, wherein the in-plane retardation of the third optical compensation film is 276 nm.

16. A liquid crystal display panel, comprising the display substrate according to claim 1.

17. A display device, comprising the liquid crystal display panel according to claim 16.

* * * * *